(No Model.) 4 Sheets—Sheet 1.
G. W. PRICE.
APPARATUS FOR PROPELLING BY MOTION OF VESSELS.
No. 567,999. Patented Sept. 22, 1896.

Witnesses.
Charles T. Hannigan
Remington Sherman

Inventor.
George W. Price
by Geo. H. Remington & Co.
Att'ys

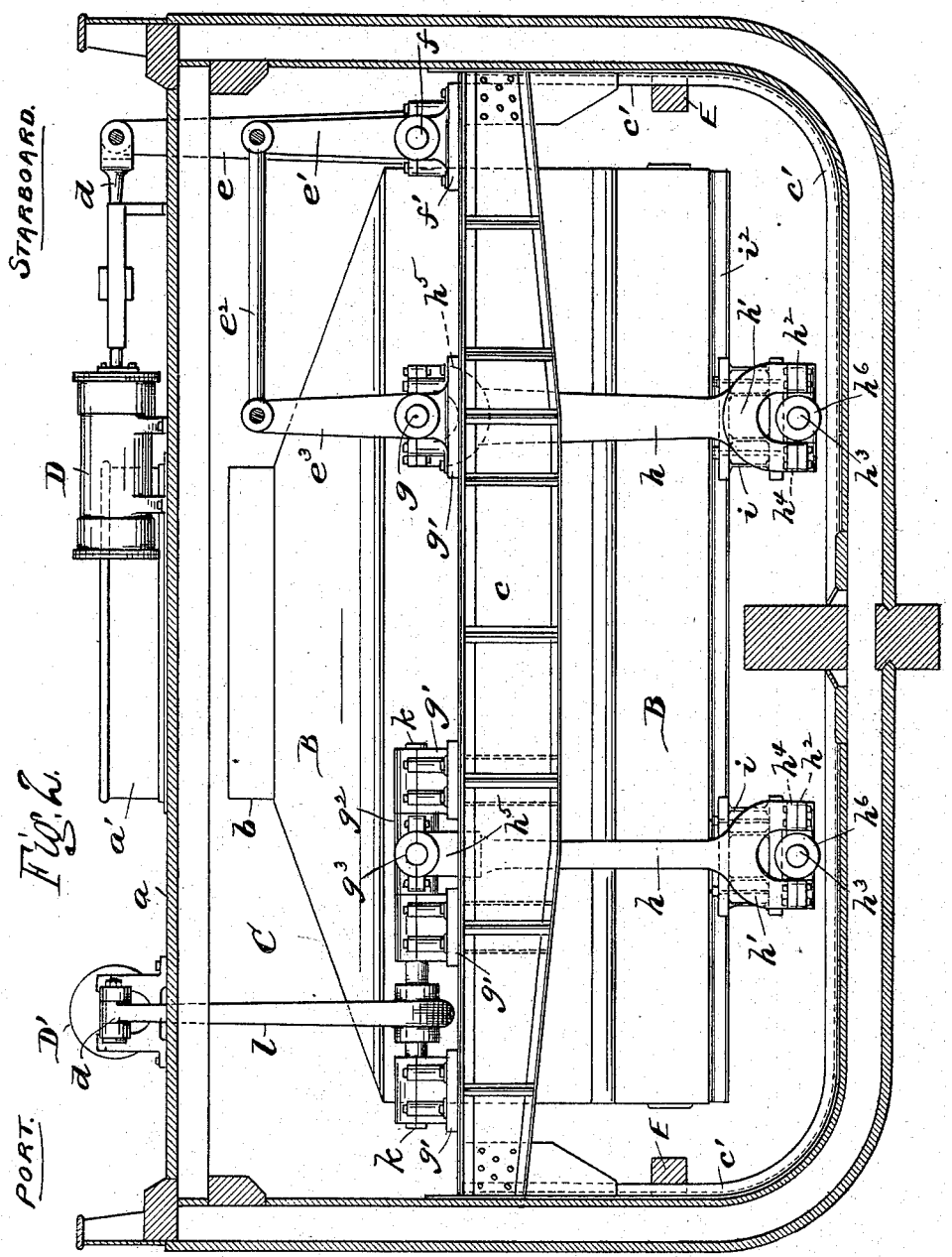

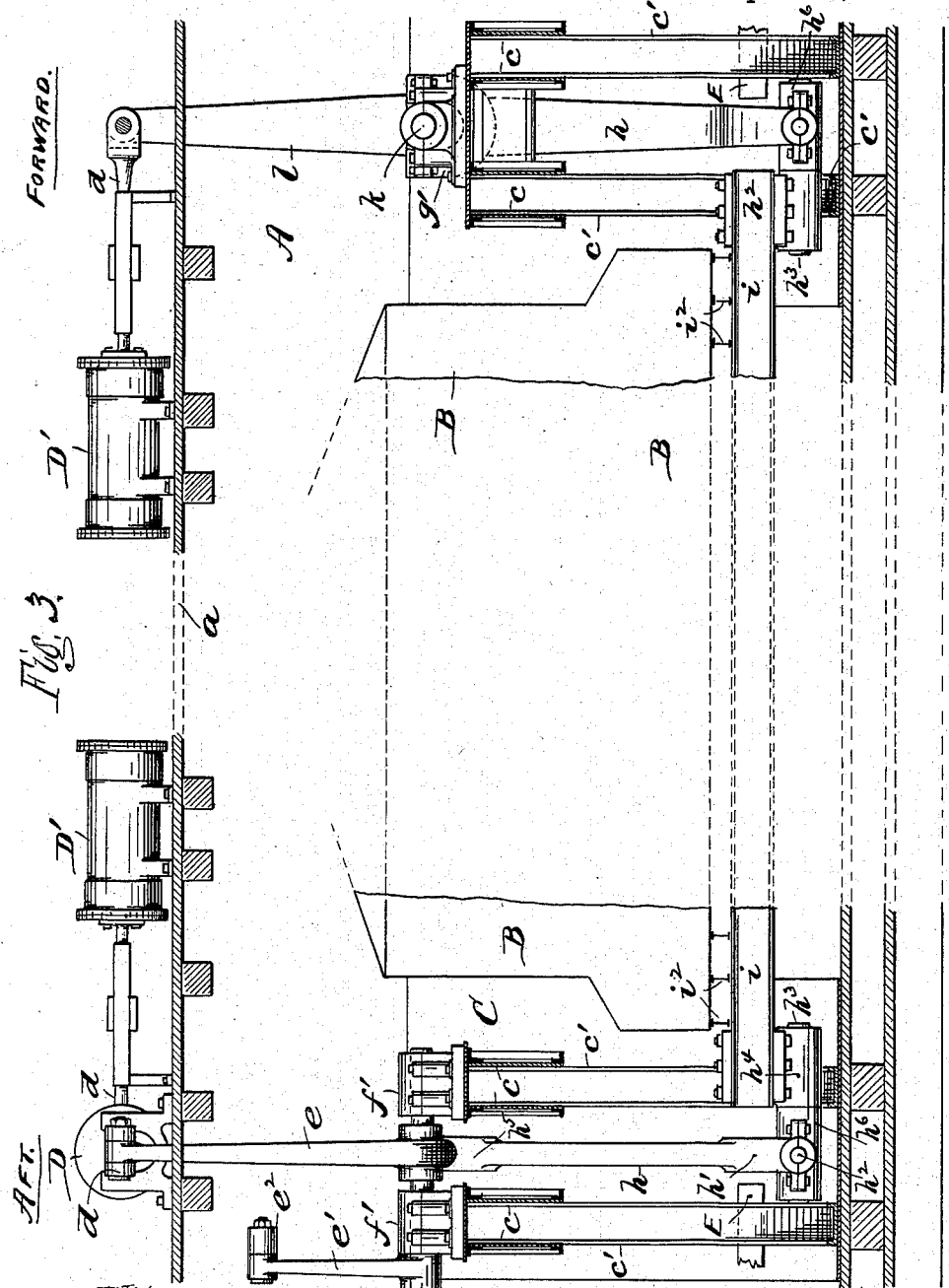

(No Model.)  
4 Sheets—Sheet 4.

G. W. PRICE.
APPARATUS FOR PROPELLING BY MOTION OF VESSELS.

No. 567,999.  
Patented Sept. 22, 1896.

UNITED STATES PATENT OFFICE.

GEORGE W. PRICE, OF PROVIDENCE, RHODE ISLAND, ASSIGNOR TO THE OCEAN POWER PROPELLER COMPANY, OF SAME PLACE.

APPARATUS FOR PROPELLING BY MOTION OF VESSELS.

SPECIFICATION forming part of Letters Patent No. 567,999, dated September 22, 1896.

Application filed July 7, 1896. Serial No. 598,289. (No model.)

*To all whom it may concern:*

Be it known that I, GEORGE W. PRICE, a citizen of the United States, residing at Providence, in the county of Providence and State of Rhode Island, have invented certain new and useful Improvements in Apparatus for Propelling by Motion of Vessels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In a pending application for United States Letters Patent, filed by me January 15, 1896, Serial No. 575,553, I have shown and described a motor for propelling vessels, the power therein employed being air compressed by the changing equilibrium or oscillations of the vessel due to the action of waves of water against it, the vessel being provided with a suspended self-leveling cargo-holding tank connected with suitable air-compressing engines.

In my present application for patent the invention resides, essentially, in the novel manner of suspending the tank. In other devices of this class the tanks have been mounted at the top or overhead, so as to swing or oscillate substantially like a pendulum. An objection to such former construction or manner of suspension is that in case the weight or load be unevenly distributed in the tanks the movements of the latter are thereby rendered irregular and uncertain. Moreover, in such former devices the live force or pressure developed varies with respect to the vertical location of the load in the tank. The object I have in view is to so mount or suspend the tank that its relative movements, or rather the oscillations of the vessel proper with respect to the tank, will be unaffected by the position or location of the weight in the tank.

Another advantage possessed by my present invention is that the percentage of working friction is greatly reduced, thereby increasing the efficiency of the apparatus.

Figure 1:
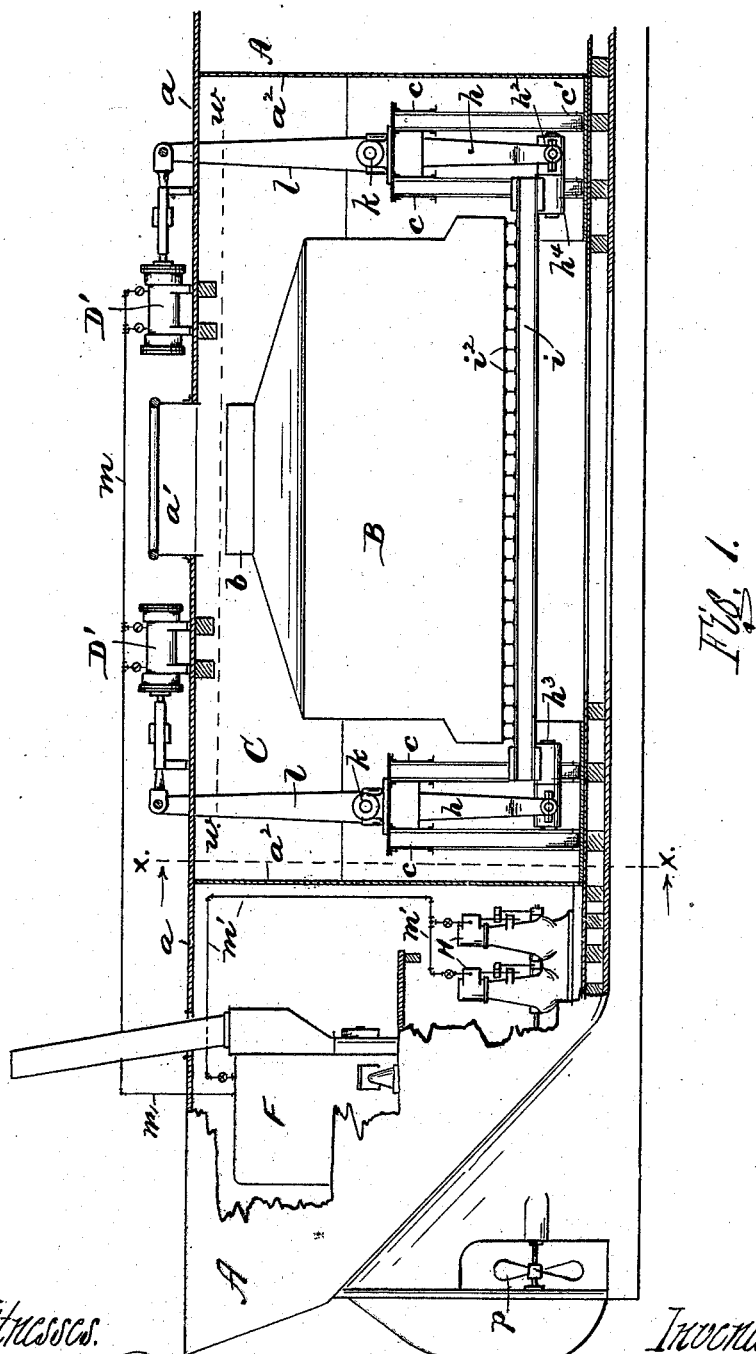
Figure 5:
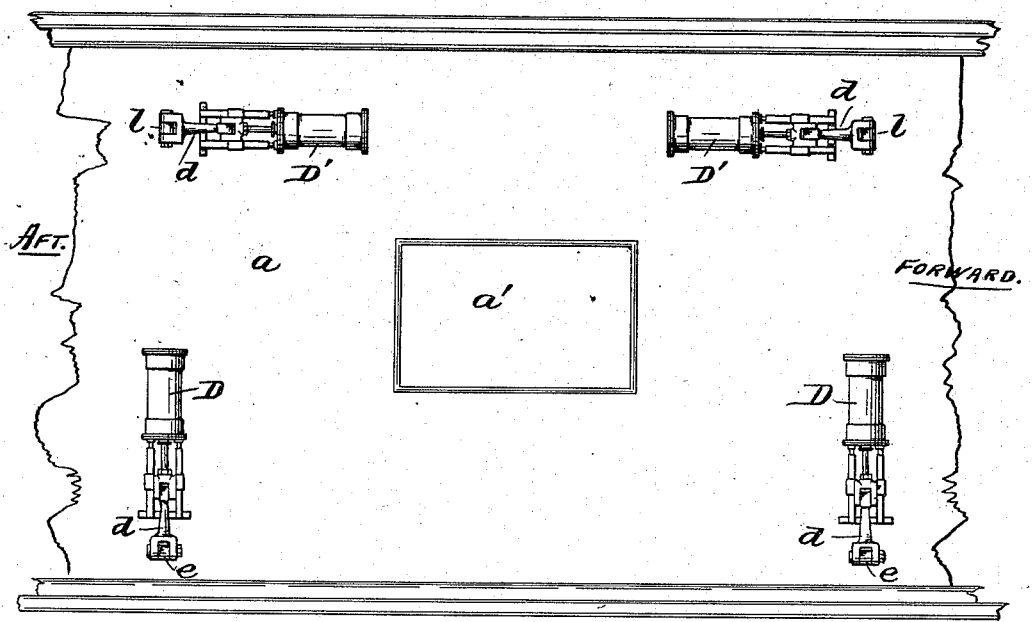
Figure 4:
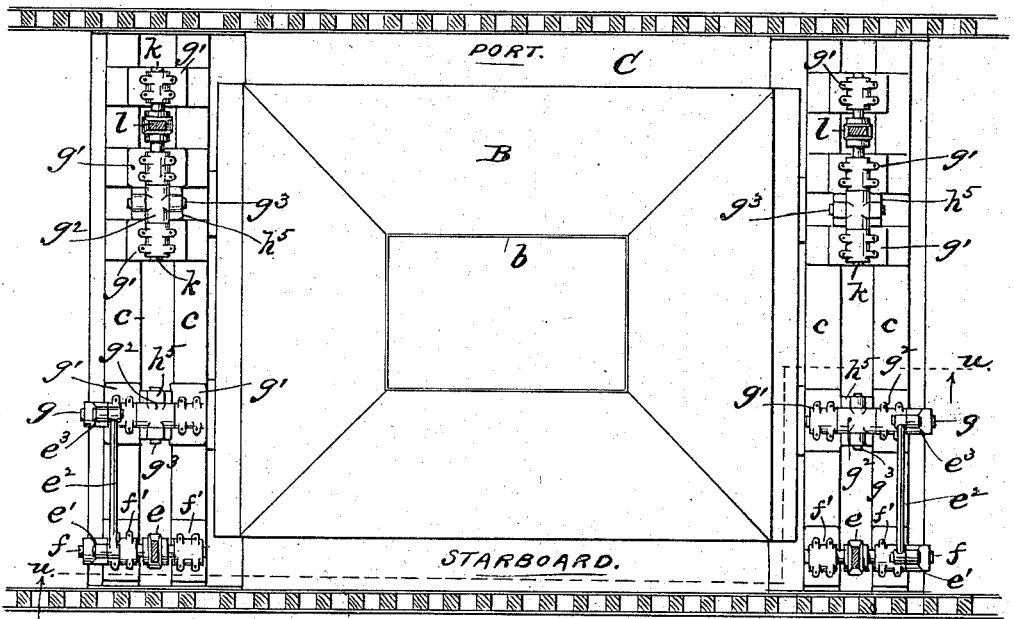

In the accompanying four sheets of drawings, illustrating my present invention, Figure 1 is a longitudinal sectional view of the after portion of a vessel, showing a side elevation of the tank and its connections. Fig. 2 is a transverse section, on enlarged scale, taken on line $xx$ of Fig. 1. Fig. 3 is a longitudinal section, also enlarged, taken substantially on the irregular line $uu$ of Fig. 4. Fig. 4 is a plan or horizontal sectional view taken on line $ww$ of Fig. 1, the deck being removed; and Fig. 5 is a corresponding plan view showing the arrangement of the air-compressors on the deck.

I would state here that neither the general form or type of vessel nor the air-compressors, engines, and boilers, and their connections mounted in the vessel, constitute an essential part of my present invention, since various forms or modifications of said parts or mechanisms may be made therein without materially affecting the manner of suspending the weight-tank.

A, again referring to the drawings, designates the hull of a vessel or barge capable of being provided with my improvements. As drawn, (see Fig. 1,) the after part of the vessel's hull is divided below the main deck $a$ by two bulkheads or partitions $a^2$, thereby forming an inclosed space or chamber C between them. It is in this chamber that the weight or cargo carrying tank B is mounted. The form of the tank represented is substantially rectangular, its upper part being beveled and having a center opening $b$ therein, located directly below the covered main hatchway $a'$. It is through these openings that the tank is filled or charged.

At the forward and after ends of the tank are located fixed double girders or tank-supporting beams $c\,c$. These latter extend transversely of the vessel, the ends thereof being rigidly secured to suitable plates, channel-irons $c'$, &c., fastened to the walls of the vessel. These girders $c$ carry the several movable members (soon to be described) which support the tank. The base of the tank rests on rolled beams $i^2$, which in turn bear upon heavy longitudinally-extending beams $i$, the latter having strong stands or brackets $h^4$ secured thereto, from which extend large fore-and-aft shafts or wrist-pins $h^3$. It is to these pins that the four suspension-levers $h$ are connected, thus carrying the entire weight of the tank and its contents. Each of the said levers $h$ has its lower end $h'$ yoke-shaped and provided with bearings adapted to receive the lateral pins or trunnions $h^2$ of the corresponding journal-box $h^6$, in which latter the said wrist-pins $h^3$ are journaled. (See Figs. 1, 2, and 3.) As thus constructed it will be seen that the device is capable of performing the functions of a universal joint. The levers $h$ are mounted on and supported by the fixed girders $c$, as follows:

To the top of the girders, and at the starboard side of the vessel as drawn, are firmly secured two sets of bearings $g'$, located forward and aft of the tank $b$, in which are journaled the two fore-and-aft strong short shafts $g$. Between each set of said bearings is mounted on the shaft $g$ a box $g^2$, having lateral trunnions $g^3$ journaled in yokes $h^5$, integral with the two corresponding suspension-levers $h$, said yokes being formed at the upper end of the levers. (See Figs. 2 and 4.) The other two levers $h$, located on the port side of the vessel and also forward and aft of the tank, are constructed substantially the same as those just described, the only difference being that the upper yokes $h^5$ of the levers, the trunnion-boxes $g^2$, and bearings $g'$, secured to the girders $c$, are arranged transversely of the vessel, or athwart-ship. In lieu of the shafts $g$ I employ two shafts $k$, journaled in said bearings $g'$. The shafts $k$ are extended toward the port side, the outer ends thereof being supported in bearings $g'$. To each of the said extensions is secured a vertical lever $l$, its upper portion extending through the deck $a$ and being suitably jointed to a connecting-rod $d$, which in turn actuates the cross-head and piston of a suitable air-compressing device, as D′, located on the port side and longitudinally of the vessel, all as clearly shown. It will be seen that, as drawn, each of the tank-suspending levers $h$ is mounted and connected so as to operate an independent air-compressor. The port levers control the port compressors D′, while the starboard levers perform a like office for the starboard compressors D. These latter, however, extend crosswise of the vessel. (See Fig. 5.) In order to operate the said compressors D, the short shafts $g$ are each provided with a lever $e^3$, jointed to a similar arm or lever $e'$ by means of the link $e^2$. (See Fig. 2.) To the starboard ends of the girders $c$ are secured boxes $f'$, in which a longitudinally-extending shaft $f$ is mounted. To this shaft the said lever $e'$ is secured. Thus it will be apparent that upon oscillating the corresponding lever $h$ the shaft $f$ will be similarly oscillated. A lever $e$, substantially like lever $l$, is secured to shaft $f$, its upper end passing through the deck and being jointed to a connecting-rod $d$, &c., of the compressor D, substantially as before described with respect to the compressors D′. From the foregoing it is clear that any oscillatory movement of the vessel, as in rolling or pitching, or even a combination of such movements, will, when coacting with the suspended tank B, actuate some or all of the compressors, thereby compressing air which may be utilized for propelling the vessel. It will be seen, too, that the relative movements of the vessel to the tank, within fixed limits, does not disturb the equilibrium of the tank, the latter remaining substantially stationary and level, or at least movable in horizontal planes. In order to prevent a too great movement or stroke of the compressors, I provide the sides or walls of the vessel, adjacent to the tank, with a series of suitable stops or buffers E. When any of the latter are in contact with the tank, the piston movement of the compressors is for the time arrested, at which instant all the parts or members then oscillate or move in unison with the vessel. Consequently no compressor action takes place, as before stated.

I prefer to provide vessels equipped with my improvement with auxiliary propelling power, substantially as represented in Fig. 1, wherein F indicates a suitable steam-boiler in which steam may be generated to operate engines H coupled to the propeller $p$, such auxiliary power being more particularly useful in working the vessel into and out of port. When at sea, the steam-power may be dispensed with and the power derived from the waves alone used, or, if desired, both forces combined may be employed. Suitably valved steam-piping $m'$ connects the boiler and engine, through the medium of which the action of the propeller is controlled. Upon converting the wave action into useful work by means of the tank B, &c., the air thus compressed by the several compressors D D′ is conducted from the latter via valved piping $m$ to the storage reservoir, or as drawn into the boiler F, the air under pressure being transmitted to the propelling-engine H by the inlet-piping $m'$.

By means of my present invention it is obvious that the manner of suspending the cargo-carrying tank B is such that the relative movements thereof will be performed in substantially parallel horizontal planes, the device being immensely strong, yet capable of working easily and quickly.

I claim as my invention—

1. In propelling apparatus for vessels of the class described, a cargo-carrying tank B suspended by means of suitably-mounted swinging or oscillating levers jointed to the lower portion of the tank, whereby the latter is capable of universal movement in substantially horizontal planes, and air-compressing devices actuated by and moving in unison with said swinging levers, substantially as hereinbefore described and for the purpose set forth.

2. In propelling apparatus for vessels of the class described, the combination with laterally-separated fixed girders or beams rigidly secured to the vessel, and fixed air-compressors arranged to be connected to a suitable propelling-engine, of a suspended cargo-carrying tank B located between said girders, a series of swinging levers supported by and extending downwardly from the girders and jointed to the lower portion of said tank, thereby suspending the latter and adapting it to swing in substantially horizontal planes, and movable connections through which the said air-compressors are operated, said connections adapted to be actuated by and in unison with the swinging levers, substantially as described.

3. In propelling apparatus for vessels of the class described, the combination of oppositely-located channel irons or members and plates rigidly secured to the sides of the vessel, a pair of composite double beams or supporting-girders $c$ extending transversely of the vessel and firmly secured to said members and plates, a cargo-carrying tank B, and swinging suspension-levers $h$ supported by said girders and jointed to the lower portion of said tank, substantially as described.

4. In apparatus for propelling by motion of the vessel itself, the cargo-carrying tank B suspended solely by swinging levers $h$ jointed to the lower part of the tank, fixed girders $c$ arranged transversely of the vessel and supporting said levers, and stops or buffers, for limiting the relative movements of the tank with respect to those of the vessel, substantially as described.

In testimony whereof I have affixed my signature in presence of two witnesses.

GEORGE W. PRICE.

Witnesses:
GEO. H. REMINGTON,
REMINGTON SHERMAN.